(No Model.)  3 Sheets—Sheet 1.
A. GRAEMIGER.
APPARATUS FOR DYEING, SCOURING, AND BLEACHING YARN IN COPS.
No. 372,795.  Patented Nov. 8, 1887.
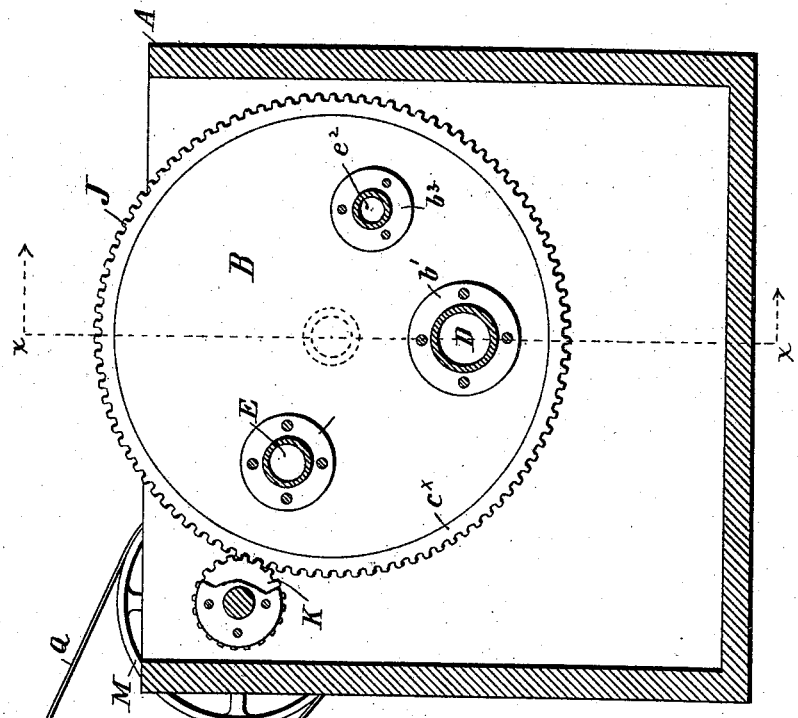
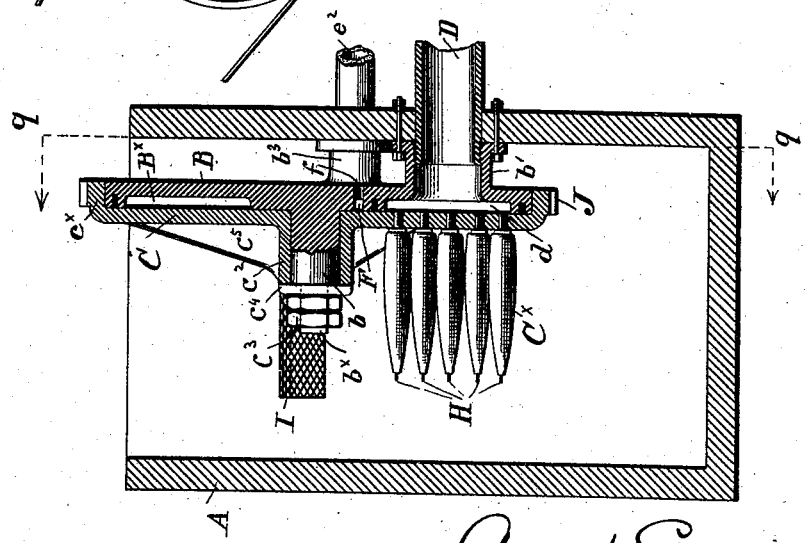
WITNESSES:
INVENTOR
August Graemiger
By his Attorneys (No Model.) 3 Sheets—Sheet 2.
A. GRAEMIGER.
APPARATUS FOR DYEING, SCOURING, AND BLEACHING YARN IN COPS.
No. 372,795. Patented Nov. 8, 1887.
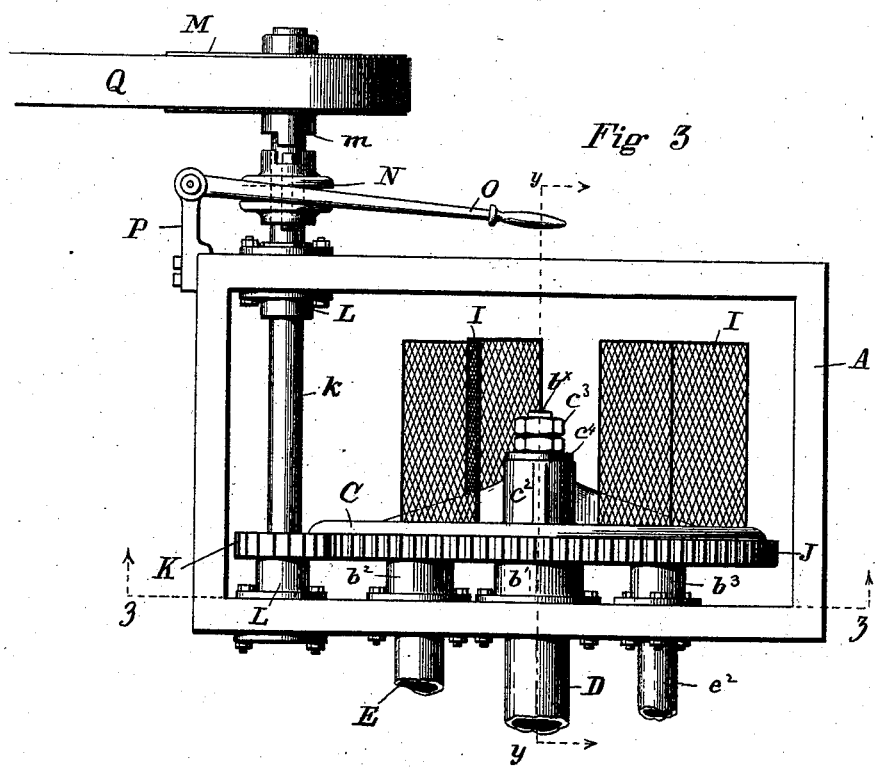
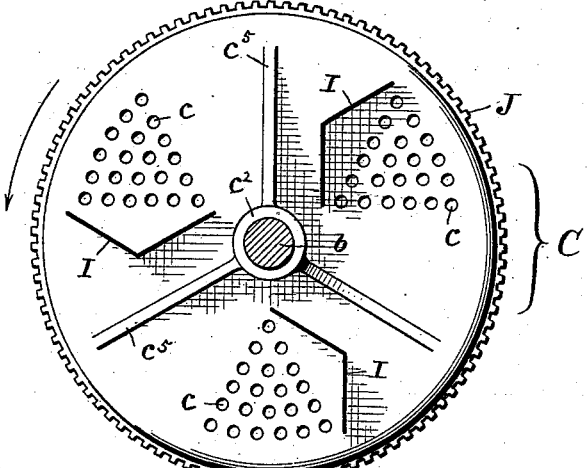
WITNESSES.
INVENTOR (No Model.) 3 Sheets—Sheet 3.
A. GRAEMIGER.
APPARATUS FOR DYEING, SCOURING, AND BLEACHING YARN IN COPS.
No. 372,795. Patented Nov. 8, 1887.
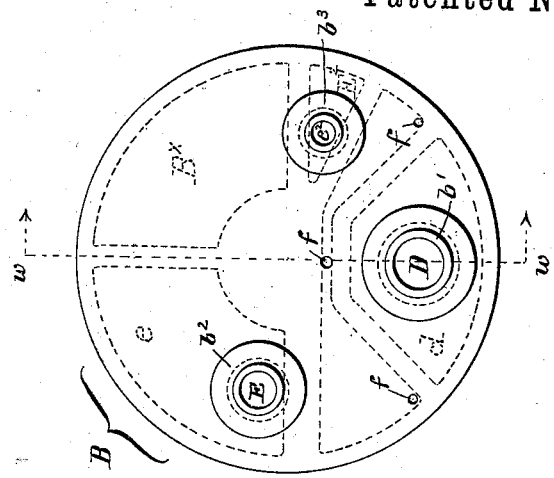
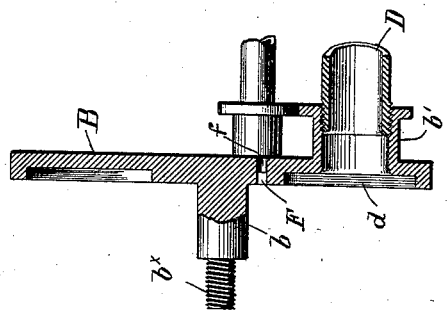
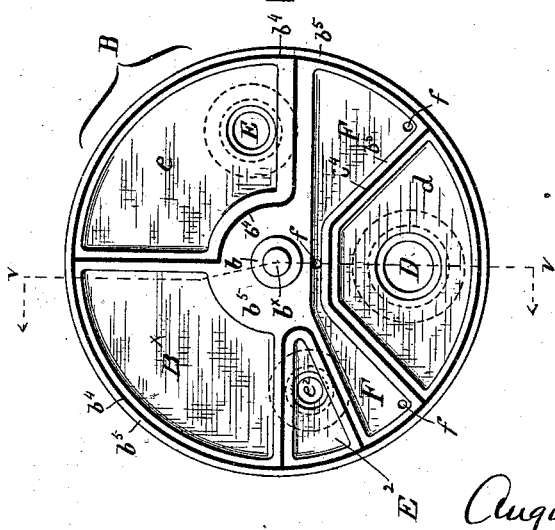
WITNESSES:
INVENTOR

UNITED STATES PATENT OFFICE.

AUGUST GRAEMIGER, OF CROMPTON, RHODE ISLAND, ASSIGNOR TO THE CROMPTON COMPANY, OF SAME PLACE.

APPARATUS FOR DYEING, SCOURING, AND BLEACHING YARN IN COPS.

SPECIFICATION forming part of Letters Patent No. 372,795, dated November 8, 1887.

Application filed August 25, 1887. Serial No. 247,850. (No model.)

*To all whom it may concern:*

Be it known that I, AUGUST GRAEMIGER, a citizen of the Republic of Switzerland, domiciled at Crompton, in the town of Warwick, county of Kent, and State of Rhode Island, have invented certain Improvements in Apparatus for Dyeing, Scouring, Bleaching, and otherwise Treating Yarn in Cops, of which the following is a specification.

My invention is of general applicability in dyeing, mordanting, bleaching, steaming, scouring, washing, drying, or otherwise treating yarns of cotton, silk, wool, worsted, or other animal or vegetable fiber, in the form of cops, or in kindred compact forms, by either sucking or forcing liquid dyes, or other liquids used in dyeing, mordanting, bleaching, scouring, steaming, or otherwise treating the cops, through the cops when mounted upon hollow perforated tubes, skewers, or injection spindles, which extend respectively through the cops and render every portion of each cop subject to the action of said liquids.

The foregoing operations broadly as such, and as separately conducted in the same or in different machines, are not novel with me, and attempts have heretofore been made, thereby, to practically dye, bleach, and otherwise treat, cotton and other yarns in cop and other compact forms. So far, however, as my knowledge extends, the practice has never been practically or successfully conducted, until the date of an invention made by me, application for patent for which was by me filed in the United States Patent Office upon April 14, 1887, as Serial No. 234,763, to which application reference is to be made.

My present invention having the same objects and purposes as, and being an improvement upon, the aforesaid invention, it is essential for an accurate understanding of the features of distinction that the objects, purposes, and salient characteristics of my former invention should be briefly stated.

The object of my former invention, which is of general applicability for dyeing, bleaching, scouring, mordanting, drying, and otherwise treating yarns of various kinds in cop and other compact forms, is the provision of means whereby all of the cops composing any given series or succession, regular or irregular, of cops or of tiers or groups of cops, may, in the selected series or succession,—as to each cop, tier or group, successively, but as to the entire series or succession of given cops, tiers, or groups collectively,—be contemporaneously or simultaneously subjected each to its appropriate step of the contemporaneously conducted successive steps composing the selected process, of any one of which processes, however, continuity of operation in a greater or a less degree, is the essential desideratum and the salient characteristic.

To the foregoing ends my said former invention embraced apparatus having the capacity for performing or carrying out any one of several cognate processes or methods of treatment of yarn in cops or kindred compact forms, and apparatus, moreover, so constituted as to be readily convertible into, or applicable for use as, any one of several cognate yet distinct devices, respectively susceptible of the performance of a particular kind of work, that is to say of the practice of some one of the said several cognate processes, hereinafter recapitulated, all of which, as processes or modes of treatment, were and are novel with me.

Broadly stated, my former invention, so far as processes are concerned, as applied to dyeing, mordanting, bleaching, scouring, steaming, washing, or otherwise similarly treating by the impregnation of liquids, yarn in cops, comprehends, first, the contemporaneous but distributive subjection of the cops composing a series each in turn to its appropriate step of the following contemporaneously conducted successive steps or operations, namely: first, saturation or impregnation by sucking or forcing the selected liquids through given cops; and, second, substitution of fresh cops to be charged for given charged cops.

Similarly, also, my former invention, as applied to the operation of impregnation above mentioned, comprehends, second, the subjection of the cops in the manner above stated, to the following successive steps or operations, namely:—first, saturation or impregnation by sucking or forcing the selected liquid through given cops; second, liquid-exhaustion by forcing or sucking air or other suitable fluid through given charged cops; and, third, substitution of cops to be charged and liquid-exhausted for given charged and liquid-exhausted cops.

Similarly, again, my former invention as applied to exhausting surplus liquid from charged cops, comprehends, third, the subjection of cops, in the manner above stated, to the following successive steps or operations: first, liquid-exhaustion by forcing or sucking air or other suitable fluid through the cops; second, substitution of cops to be liquid-exhausted for given liquid-exhausted cops.

Similarly, again, as applied to operations of dyeing with easily oxidizable liquid dyes, my former invention comprehends, fourth and fifth, the subjection of the cops in the manner above stated with reference to the first two operations which involve impregnation with liquids,—and in connection either with the two steps of saturation and substitution which are involved in the practice of the first of my foregoing processes, or else in connection with the three steps of saturation, liquid-exhaustion, and substitution which are involved in the second of my foregoing processes,—to a preliminary step of air-exhaustion before saturation or impregnation proper, by sucking or forcing air from out given cops to be charged or saturated.

My former invention further comprehends apparatus for conveniently effectuating the five several processes which respectively reside in the practice of the foregoing respectively recited connected steps or operations,—the salient characteristic of which is that it is a rotary apparatus the cop carrier of which is a conical or cylindriform band or strap, to the peripheral exterior face of which groups of radially projecting cops are applied, and which is mounted upon a fixed conical or cylindriform carrier body fixedly supported referably to a tank and containing or embodying the mouths of certain conduits which open through its peripheral face.

In order that the aforesaid apparatus which I devised for the purpose of carrying into operation any one of the above mentioned processes or methods of treatment, may be understood,—as it is important that it should be understood in order that the distinctions between it and my apparatus, which is designed to effectuate the same processes or methods of treatment,—may become apparent,—it is proper to state briefly that the machine which forms a part of my former invention comprehends: first, a fixed tank, vat, or or other recipient, for containing a given quantity of liquid coloring matter or other preferred liquid, and for subserving the purpose of a frame-work to the machine as an entirety; second, a carrier body which, referably to the fixed tank and the rotating cop carrier, is simply a fixed conical or cylindrical device subserving the double purpose, first, of being a fixed body with reference to, and upon or around, which the cop carrier has rotary movement, and, second, of being a body containing or embodying upon its peripheral surface, or of being a supporting device serving conveniently to present to the perforations in the cop carrier, the mouths or chambers of the conduits; third, a rotatable strap or band-like encircling cop carrier, or device which carries radially projecting cops, which is mounted upon the peripheral surface of the carrier body, is perforated referably to the points of and means for attachment of said cops, and has such rotary movement referably to the carrier body and to the tank that its perforations are in predetermined continuing sequence placed in communication, preferably through perforated injection spindles, with the axial apertures of the cops on the one hand and with the peripherally opening conduit mouths and the dead face on the other; fourth, a charging conduit in exterior communication with a suction or pressure pump, and interiorly or as to its mouth, conveniently through the intermediation of the carrier body, in communication for the time being with given perforations in the cop carrier; fifth, a liquid-exhausting conduit in exterior communication with a suction or pressure pump, and interiorly or as to its mouth, conveniently also through the intermediation of the carrier body, in communication for the time being with other given perforations in the cop carrier; sixth, an air-exhausting conduit in exterior communication with a suction or pressure pump, and interiorly or as to its mouth, conveniently also through the intermediation of the carrier body, in communication for the time being with other given perforations in the cop carrier; seventh, a dead face formed upon or embodied in the peripheral carrier surface of the carrier body, which referably to the encircling cop carrier, and as a dead face generically considered, is simply a in any convenient manner suitably formed blank or unchambered segment of the periphery of the carrier body, or a gap or opening in said periphery, or an open chamber in said periphery, so located above the level of the liquid in the tank as to act in connection with cops above said level,—calculated, in the preferred mode of employing the apparatus, for the time being to act in connection with yet other given perforations of the cop carrier and permit of the removal, at a period subsequent to their treatment, of the cops applied to said perforations, and of the substitution of others in their stead.

Of my foregoing apparatus the tank, the perforated cop carrier, the charging conduit, the liquid-exhausting conduit, the air-exhausting conduit, and,—as a device of convenience merely, for the purpose of conveniently presenting to given perforations of the cop carrier the mouths of said conduits, and as a device, moreover, with reference to which the cop carrier is conveniently arranged to rotate,—the carrier body,—are the vital members, elements, or instrumentalities.

In order to understand the operation of the apparatus included in my former invention, it is sufficient to add that the cop carrier, which, as stated, encircles or surrounds after the manner of a strap or band the carrier body containing the peripherally presenting mouths of the conduits, rotates relatively to the tank and the carrier body in such manner as, during a part of its rotation, to occasion the immersion in liquid in the tank of cops carried by it, and also, during a further part of its rotation, the presentation of its perforations with reference to which the cops are secured to it, to the mouths of the conduits.

The machine which I have now invented, which is represented in the accompanying drawings, and which, in that it is simpler and cheaper of construction, is an improvement upon my former machine, is to be contradistinguished from my said machine essentially in the fact that its cop carrier is constructed as a disk, to the front face of which the cops are applied preferably at right angles; in the further fact that the carrier body is also constructed in the form of a disk through the front face of which the mouths of the conduits, preferably in the form of recessed chambers, open and are circumferentially distributed or placed at proper intervals, and radially disposed between the center and the circumference of said carrier body, and in the further fact that the disk-shaped cop carrier is caused to rotate in contact with the front face of the disk-shaped carrier body and in a plane parallel therewith.

In other respects than the above my present machine embodies all of the essential features of my former machine, is equally well adapted to effectuate the process which comprises charging and substitution,—or the process which comprises charging, liquid-exhaustion and substitution,—or the process which comprises liquid-exhaustion and substitution,—or the process which comprises air-exhaustion, dyeing, and substitution,—or the process which comprises air-exhaustion, dyeing, liquid-exhaustion, and substitution,—and comprehends all of the elements which are necessary to the conduct or practice of any one of the foregoing processes, and consequently of that one which involves the greatest number of steps,—although, as is hereinafter explained, in the practice of such of the processes as involve the lesser number of steps, certain of the elements of the said apparatus are inert or for the time being thrown out of action.

Apparatus conveniently embodying my invention, and adapted to effectuate the separate practice of any one, and consequently of all, of the processes heretofore invented by me and hereinbefore referred to, is represented in the accompanying drawings and described in this specification, the particular subject matter claimed as novel being hereinafter definitely specified.

In the drawings, Figure 1 is an end elevation of the entire machine, section being supposed through the tank, carrier body, charging conduit, and cop carrier, in the plane of the dotted line $x$—$x$ of Fig. 2, and also in the plane of the dotted line $y$—$y$ of Fig. 3, and sight being taken in the direction of the arrows upon said lines. Fig. 2 is a rear elevation of the said machine, section being supposed through the tank in the plane of the dotted line $z$—$z$ of Fig. 3, and the dotted line $q$—$q$ of Fig. 1, and sight being taken in the direction of the arrows upon said lines. Fig. 3 is a top plan view of the entire machine. Fig. 4 is a front elevational view of the cop carrier, being a view of its exterior surface to which the cops are applied and the screens affixed. Fig. 5 is a front elevational view, or a view showing the front face, chambers, and unchambered surfaces, of the carrier body removed from the tank. Fig. 7 is a rear elevational view of the same. Fig. 6 is a central, vertical, sectional, edge elevation of the carrier body represented in Figs. 5 and 7, section being supposed in the plane of the dotted line $v$—$v$ of Fig. 5, and also in the plane of the dotted line $w$—$w$ of Fig. 7, and sight being respectively taken in the direction of the respective arrows upon said lines.

Similar letters of reference indicate corresponding parts.

In the drawings, A is a tank or fixed receiving vessel, preferably of such form and strength as to itself constitute or act as a frame-work of the entire apparatus, that is to say as a frame-work with reference to which the cop carrier has movement and the carrier body and conduits are fixed.

B is the carrier body, preferably a casting, and made in the form of a disk, from the front face of which projects a cylindriform axial stud or gudgeon $b$ upon which the cop carrier is journaled for rotary movement. This carrier body is supported in a vertical plane against the rear wall of the tank in any preferred manner, but conveniently by body tubes $b'$ $b^2$ $b^3$ cast integral with or applied to it, and being in effect continuations of the conduits the interior extremities of which are conveniently screwed into them.

D is a charging conduit, preferably fixedly connected with the tank by being passed through an aperture in its rear wall and threaded into, or otherwise permanently and integrally connected with, the body tube $b'$ as shown in the drawings. This charging conduit leads to, or is exteriorly in direct communication with, a suction or pressure pump of any preferred character, which is adapted either to suck or to force any desired liquid through said conduit, for the saturation, impregnation, or charging of given cops.

E is a liquid-exhausting conduit, preferably also fixedly connected with the tank by being passed through an aperture in its rear wall and threaded into, or otherwise permanently and interiorly connected with, the body tube $b^2$. This liquid-exhausting conduit leads to, or is exteriorly in direct communication with, a suction or pressure pump of any preferred character, which is adapted either to suck or to force air, or other fluid employed as a liquid-exhausting medium, through said liquid-exhausting conduit.

I have not represented in the drawings the pumps referred to, for the reason that it is not necessary to an understanding of the invention, the pumps being simply, as stated, of any preferred and well known character, and there being no connections other than those which a competent mechanic would naturally employ.

The disk which forms the carrier body B is of sufficient breadth or thickness to permit of there being formed in its front face, preferably in its casting, certain circumferentially and radially distributed chambers, depressions, or compartments, each independent of the other. The principal chambers in the carrier body represented, are the charging chamber $d$ and the liquid-exhausting chamber $e$, the said chambers being the terminal portions or mouths, respectively, of the charging conduit and of the liquid-exhausting conduit. The charging chamber is, in the mounting of the carrier body, the chamber lowermost within the tank. The liquid-exhausting chamber $e$, considered with reference to the mounting of the carrier body within the tank, is preferably, as shown in Fig. 5, formed within the right hand upper quarter portions of the body, or that portion which is located in the upper portion of the tank and above the level of any contained liquid. This chamber is not in communication with the charging chamber,—considered with reference to the direction of travel of the cop carrier,—lies beyond said chamber,—and necessarily opens above the level of any liquid in the tank.

$E^2$ is an air-exhausting chamber, also formed in the front face of the carrier body between the dead face and the charging chamber. This chamber is, conveniently through the intermediation of the body tube $b^3$, in communication with an air-exhausting conduit $c^2$, leading to and exteriorly in communication with a suction or air pump adapted to suck air through said air-exhausting conduit for the air-exhaustion of given cops. This chamber is preferably proportioned and placed as shown in order to afford a uniform exposure of the cops to the action of its pump and afford the greatest possible latitude for variance of level in the liquid in the tank.

Each of the foregoing chambers is distinct from and unconnected with either of the other two. All of the foregoing chambers are, as stated, in effect, sunken portions, recesses, or depressed compartments in the front face of the carrier body between its peripheral edge and its center. The charging chamber and the liquid-exhausting chamber are preferably of the same face area, as shown in Fig. 5, and of sufficient area to permit of the presentation over them of an entire group of perforations of the cop carrier. The air-exhausting chamber is much smaller, being preferably of such breadth and face area as to permit of the presentation over it of but one radial line of the series of radial lines or series of perforations which together compose a given group.

All of the foregoing chambers have continuous edge boundaries, which are lettered $b^5$, being the unchambered or unrecessed bounding portions of the level or true front face of the carrier body, against which face the cop carrier is mounted and rotates.

Instead of making the chambers referred to in the form of extended recesses, it is, as is apparent, quite possible to make them as a series of minor chambers or channels of perforations through the carrier body, in communication upon the one hand with the conduits the mouths of which they would in such case collectively constitute, and on the other hand adapted to register with given perforations in the cop carrier.

Lying, considered with reference to the direction of movement of the cop carrier, beyond the liquid-exhausting chamber and intermediately between said liquid-exhausting chamber and the charging chamber, is, in the form of carrier body depicted, a blank chamber formed in the front face of said carrier body, which I specifically designate "the dead face $B^x$", and which is in communication with neither the charging, the air-exhausting, or the liquid-exhausting conduits, but, referably to the cop carrier, is simply a blank surface, (preferably, as stated, however, for convenience in the casting of the carrier body, in the form of a closed or blank chamber,) calculated for the time being to present itself to such a group of perforations of the cop carrier as, in the movement of said carrier, happen to come over it. This dead face, generically considered, is not necessarily a chamber, and may, as stated, be simply a continuous sectoral portion of the front face of the body, or a sectoral opening in said body.

It is also entirely possible to employ the mouth of the liquid-exhausting conduit, or a sectoral front face area of the carrier body adjacent thereto and above the level of any liquid contained in the tank, as the dead face, generically considered;—it being manifestly apparent that it is possible to perform the operation of substituting fresh or untreated cops for liquid-exhausted cops over the mouth of the exhausting conduit, and even while the pump in exterior communication with said conduit continues in action, as the operation of the said pump could not prevent the said operation of substitution. Such use, however, of the said mouth of the exhausting conduit as a dead face is not desirable, because, as is obvious, the operation of the apparatus would be much slower, as it would be necessary to delay the act of substitution until the act of liquid-exhaustion had been performed; I simply instance the foregoing possibility of the apparatus the better to explain that the dead face proper is any portion of, or region referable to, the carrier body lying above the level of any liquid contained in the vat with reference to which said carrier body is mounted.

In the claims the term "a dead face" is used in a generic sense, and not as restricted to the special dead face B×.

F is what I term a dye slot, it being a transversely extending chamber formed in the front face of the carrier body, extending, in the construction represented, completely across said face below the line of the horizontal diameter, and at one side extending between the air-exhausting chamber and the charging chamber, and at the other side between the charging chamber and the liquid-exhausting chamber. This slot is completely bounded by unchambered portions $b^×$ of the front face of the carrier body.

$f$ are slot holes passing through the substance of the carrier body to and through its rear face and opening within the dye slot. Two of these holes are at the lowest portion of the slot to allow the liquid to run by gravity from out said slot, when the tank is emptied of liquid. This slot, which in the mounting of the carrier body lies considerably below the level of the liquid in the tank, is, by reason of the slot holes, constantly full of liquid in the tank, and serves as a liquid packing between the charging and the air-exhausting chambers and between the charging and the liquid-exhausting chambers $g$.

It is apparent that, if desired, the dye slot can be formed by completely removing the substance of the carrier body within the boundaries of said slot; a construction, in effect, such as would result were the slotted holes so numerous as to be in effect one comprehensive slot hole co-extensive with the face area of the dye slot as such. This slot is but a modified form of the dye slots set forth and claimed in my application for patent referred to, and it is of especial importance in the operation of dyeing with indigo white solution, and serves as a safe-guard to prevent suction of air by the charging pump, when employed as a suction device,—which is its preferable employment, from the air-exhausting or the liquid exhausting chambers into the charging chamber. Of course, if it were possible to maintain under continuing wear a perfect fit of the cop carrier against the face of the carrier body, that is to say a fit so close that no air could get between them, this slot would not be important; but as in practice, even with the best construction and most careful adjustment to compensate for wear, interspaces do come to exist between the body and the carrier, this slot, containing, as it does, liquid packing becomes of importance as a safeguard to the charging chamber in the practice of indigo dyeing, in which operation it is essential to prevent the suction of the charging pump from sucking air, through the interspaces between the body and the carrier, from the liquid-exhausting and air-exhausting chambers into the charging chamber, with the result of oxidizing the indigo, depositing the insoluble indigotine, clogging the fibers of the cops, and preventing the effectual circulation of the dye-stuff through said cops. In other words, in indigo dyeing, this slot opens a free passage for the white indigo solution in the tank to permeate through the crevices or interspaces between the carrier and body, into the charging chamber, and by its presence to fill said interspaces and exclude the entrance or passage of air. This slot is also of advantage, in that, as there is always, when the exhausting pump is used as a suction device, a rarefied condition or vacuum pressure in the liquid-exhausting chamber and in the interspaces between the carrier and the body in the area between the charging and liquid-exhausting chambers, its absence would permit of the drawing of the dye-stuff from the charging chamber into the liquid-exhausting chamber, a thing undesirable in practice.

Having now described the construction of the carrier body, and how that it is a convenient device for the purpose of conveniently presenting to given perforations of the cop carrier, the dead face, the terminal portion or mouth of the charging conduit, the terminal portion or mouth of the liquid-exhausting conduit, and the terminal portion or mouth of the air-exhausting conduit,—and a device, moreover, with reference to which the carrier is conveniently arranged to rotate,—C is the cop carrier, a circular flat disk fitted and mounted for rotary movement against the front face of the carrier body which it is conformed to exactly fit, and the peripheral edge of which it is conveniently formed to overlap or encircle by providing it with a peripheral angular flange $c^×$ which snugly embraces said edge. From the exterior face of the cop carrier projects an annular hub $c^2$, which exactly fits the cylindriform stud or gudgeon $b$ projecting from the front face of the carrier body, and serves as a journal boxing by the aid of which the cop carrier as an entirety rotates referably to the carrier body. The cop carrier is conveniently retained against the front face of the carrier body by the application of jam nuts $c^3$ threaded upon the threaded extremity $b^×$ of the stud or gudgeon $b$,—a washer, $c^4$, being conveniently interposed.

It is apparent that instead of forming the gudgeon $b$ upon the carrier body, and the hub $c^2$, upon the carrier, the cop carrier may be formed with a gudgeon projecting from its inside face and adapted to a cylindriform aperture or hub formed within the carrier body, in which event the jam nuts and washer would be applied against the rear face of the carrier body.

The chamber boundaries or unchambered portions $b^5$ of the carrier body are conveniently channeled to contain packing material $b^4$ of any preferred character, to make tight the regions of contact between the carrier and said carrier body.

$c^5$ are strengthening radial webs, cast or otherwise formed upon the exterior face of the cop carrier and radiating from its hub to its circumference.

The cop carrier C is provided with a series of perforations $c$ passing from its inner to its outer surface, the office of which is to permit the passage of impregnating liquid or exhausting fluid, to or from cops $C^x$ applied to the exterior of the carrier and as to their hollow cores in communication with said perforations.

The perforations may be of any desired form. Those shown are simply holes $c$ through the cop carrier, which are externally threaded to receive hollow nipples fitted to receive removable perforated injection tubes H thrust through the cops, and conveniently of a construction invented by me and constituting the subject matter of an application for patent filed by me February 8, 1887, as Serial No. 226,909. Instead, however, of employing these nipples the injection tubes, or the cops themselves, may be adapted to be fitted directly to the perforations. The perforations are conveniently, but by no means necessarily, arranged in intermittently consecutive groups, each group being composed of a given number, circumferentially considered, of radially disposed lines or tiers of perforations.

In the drawings I have represented the carrier as equipped with three distinct groups of twenty-one perforations each, the groups being of triangular outline and equispaced upon the carrier.

I are screens projecting conveniently at right angles from the front face of the cop carrier. These screens have projection exceeding that of the applied cops, and serve to take up, collect, or push aside, the scum accumulating on the surface of the liquid in the tank, and thus keep it off of the cops both as the latter are immersed in and as they emerge from the liquid. The screens, preferably as shown, present an angular or beveled face.

Rotation of the desired character may be imparted to the carrier in any convenient manner: A good way is to provide the carrier with a circumferential set of teeth J, and to provide a toothed pinion K of suitable diameter to gear with said teeth. Such a pinion may conveniently be mounted upon a shaft $k$, housed within boxings L applied to the tank, and which extends beyond the front wall of the tank and is at its extremity equipped with a band wheel M running freely upon it and provided with a clutch face $m$ adapted to be engaged by a sliding clutch collar N, feathered for endwise movement upon the shaft and controlled by a clutch lever O pivoted to a bracket P supported from the tank, or to any other fixed support. A band Q applied to the band wheel imparts motion to it, and when the clutch collar is engaged with the clutch face of said band wheel, to the shaft $k$, to the toothed pinion, and, through said toothed pinion, to the cop carrier.

Such being a description of a preferred form of apparatus adapted to effectuate my invention, it will be apparent that it is adapted for the practice of any one of the five processes to which I have hereinbefore referred: Thus, by throwing the pump or pumps operating in connection with the air-exhausting and the liquid-exhausting conduits entirely out of action, the process of dyeing, scouring, bleaching, or otherwise treating the cops by impregnation of a selected liquid, and of replacing the impregnated cops with others to be impregnated,—can be practiced. Thus, again, by shutting off the air-exhausting chamber from communication with its pump, the operation of charging or saturation with liquid, liquid-exhaustion and substituting or replacing the cops, can be performed. It is to be remarked that the foregoing operation can, in fact, be performed without discontinuing the operation of air exhaustion, inasmuch as the said operation, although inert for useful purpose in any operation except that of indigo dyeing, is harmless in any other operation involving saturation. Thus, again, by throwing the charging pump out of operation, or by shutting off the charging conduit from communication with said pump, and by removing liquid from the tank, which in such case becomes simply a fixed supporting frame-work, the operation of liquid-exhaustion of cops which have been in any other machine impregnated with the desired liquid, and of replacing said liquid-exhausted cops with fresh cops to be liquid-exhausted, can be performed. Thus, again, by shutting off the liquid-exhausting chamber from communication with its pump, the operation of air-exhaustion, impregnation, and substitution of cops can be performed. Thus, finally, all of the conduits being in communication with their respective pumps, either the operation of air-exhaustion, impregnation, liquid-exhaustion and substitution of cops, or the foregoing operation omitting the step of liquid-exhaustion, can be performed either with readily oxidizable liquid dye stuffs in the operation of dyeing, or with any desired liquid in any selected operation involving saturation of the cop.

The best results are obtained by employing both the liquid exhausting and the charging pumps as suction pumps, and by operating an independent suction pump to perform, when desired, the work of air-exhaustion.

Assuming the pumps operated as suction devices, the following is a description of the operation of my improved apparatus as represented and hereinbefore described, in carrying out the process of charging, impregnation or saturation, liquid-exhaustion, and substitution of charged and liquid-exhausted cops for fresh or untreated cops to be charged and liquid-exhausted,—an operation itself a type of all the others:—The desired liquid is introduced into the tank to a level slightly above that of the horizontal diameter of the carrier body, that is to say to a level considerably above the dye slot F, and also sufficiently above the air-exhausting chamber to permit of the complete immersion of a tier of projecting cops happening to be in registry as to their perforations with said air-exhausting chamber.

The charging pump is conveniently provided with a return pipe so as to return to the tank as much of the liquid employed as is not absorbed by or does not remain in the cops, the liquid being thereby in constant circulation from the tank to the pump and from the pump back to the tank, or vice versa. In other words, a constant circulation takes place through both the charging pump and the cops, and the liquid in the tank is reduced only by such quantity of liquids as remain in the cops. The reduction, however, when carried to an extent affecting the normal level of the supply of dye-stuff to the tank is to be compensated for, and the level maintained, by fresh supplies. The cop carrier, being rotated to bring a group of its perforations above the dead face, a cop is by an attendant supplied to each aforesaid perforation, and the carrier is then further rotated, in the direction of the arrow applied to it in Fig. 4, a sufficient distance to occasion the complete immersion of the group of cops so applied, and the presentation of the perforations to which they are applied, to the charging chamber: The pump in connection with the charging conduit being, as is preferred, supposed in operation as a suction pump, thereupon, through the aforesaid perforations of the carrier, through the charging chamber, and through the charging conduit, sucks enough of the liquid contained in the tank through the substance of each of the cops of the immersed group, to occasion the saturation and complete impregnation with said liquid of the threads composing each of said cops: While the charging pump has been acting upon the immersed group of cops referred to, the attendant has supplied to the succeeding group of perforations (which by that rotation of the carrier which occasioned the immersion of the first group, have come over the dead face) a set of fresh or untreated cops to be charged; and, so soon as he has done this, a further rotation imparted to the carrier will occasion the immersion of the group of last applied unimpregnated cops, such further advance movement of the immersed group of cops first subjected to the action of the charging pump, as will elevate them above the surface of the liquid in the tank and place the perforations to which they are applied in communication with the liquid-exhausting chamber, and,—an air-pump being supposed in operation to suck air through the liquid exhausting conduit,—and consequently in position to be acted upon by the air so, as aforesaid, sucked from out the liquid-exhausting chamber, and thereby to be exhausted of such surplus liquid as they contain at the time of their emergence from the liquid of the tank: A further rotation of the carrier (unnecessary if the mouth of the liquid-exhausting conduit be employed as the dead face) will bring the group of cops, so, as aforesaid, liquid exhausted, over the dead face to permit of their removal by the attendant, and of his supplying to the perforations from which they are removed a group of fresh or unimpregnated cops,—will at the same time bring the group of cops last acted upon by the charging pump into communication with the liquid-exhausting pump to be liquid-exhausted and bring the group of cops, applied while the group referred to was being liquid-exhausted, into connection with the charging pump to be charged.

A continuance, more or less rapid at will, of the foregoing operation constitutes a practice of that process of which impregnation, liquid-exhaustion, and substitution are the steps, and which, as an entirety, is perhaps the most important process which my present machine (as well as my former one) is adapted to effectuate.

When liquid-exhaustion is not desired, or is intended to be performed on another machine, the liquid-exhausting chamber is cut off, or its pump thrown out of action, and the foregoing described operation then becomes an operation simply of charging and cop-replacing.

I prefer, as stated, to conduct both of the foregoing operations by sucking both the charging liquids and the air from the outer surfaces of the cops inward, but it is obvious that the same result can be secured by forcing impregnating liquid and liquid-exhausting fluid from the core of the cops outwardly to their surfaces. I prefer also to use pumps strictly as such to force or suck the liquids and fluids utilized, but any other forcing or liquid-exhausting devices may be employed in the stead of pumps, and in the claims, where reference is made to them, I use the word pump generically.

When easily oxidizable liquid dyes, such, for instance, as indigo white solution, are employed in indigo dyeing, it is, as stated in my former application, important to keep air out of the solution to prevent its combining with the white indigo to form insoluble indigotine, and therefore it is of advantage to extract or exhaust the air from the cops before subjecting them to the action of the charging conduit; because, otherwise, the insoluble indigotine, being sucked or forced into the cops by the action of the charging pump, would clog the fibers of the cops, and prevent the proper circulation of the dye-stuffs through said cops in the operation of charging proper. This I conveniently accomplish by the aid of the air-exhausting chamber $E^2$ hereinbefore referred to, the perforations constituting each radial tier of perforations of a given group of cops coming in turn over said air-exhausting chamber as the carrier is rotated to occasion the complete immersion of the group in question, and thereby occasioning the subjection of the cops of such tier to the action of an air-exhausting pump,—that is to say, to an air suction,—before the cops of the tier in question come in communication with the charging chamber, and in such communication are, as stated, subjected to the action of the charging pump.

It will be apparent that, in conducting the foregoing operation, the cops will become more or less filled with the indigo solution. The period during which a given radial tier presents over the air exhausting chamber is, however, in the movement of the carrier, so limited that no impregnation, saturation, or charging proper, in the sense of a thorough circulation of liquid through the cops, takes place; and the operation of air-exhaustion is not, therefore, one of charging or saturation in the sense in which those terms are, in this specification, employed as applied to the operations conducted through the medium of the charging chamber by the action of the charging pump. Such of the dye stuff moreover, as is, by the operation of the air-exhausting pump, drawn through the cops and into the air-exhausting chamber, and as has become oxidized, is not, as is apparent, admitted into the tank at all, but is drawn off to the air-exhausting pump, from which, in practice, it is discharged into a special vessel and deoxidized before being again supplied to the tank.

The air-exhausting chamber may be employed either with or without the liquid-exhausting chamber, the latter being either active or inert at the will of the operator.

In order to employ my apparatus for scouring, bleaching, steaming, mordanting, or washing yarn in cops, it is apparent, that it will be only necessary to supply the desired bleaching or other selected liquid to the tank and charging pump, and to repeat in connection with such liquid the operation already described. If desired, the liquid-exhausting pump can be replaced by an injector or kindred device employed to inject steam through the cops, or the apparatus being placed in a hot chamber the liquid-exhausting pump may be used to exhaust or draw hot air through them.

I have hereinbefore used and also in the claims use such terms as "disks", "disk-like", and "disk-shaped", as applied to both the carrier body and the cop carrier, not, perhaps, in the strictest technical sense of these terms, but because of their general appropriateness to characterize devices having such general form as the cop carrier and the carrier body represented,—the gist of the nature of which, so far as form is concerned, resides in the fact that they are each, for purposes of mechanical construction and operation, a flat body, preferably, of course, but not necessarily, circular in outline, and adapted by reason of their flatness and general similarity of form, when placed and rotated in parallel planes together to operate in essentially such manner as has hereinbefore been set forth.

The general idea of the construction of the carrier body is that it should be a flat surface, erected in a vertical or approximately vertical plane, embodying preferably sunken or channeled depressions or compartments—being its chambers so called—and constituting the mouths of its conduits, and having a level front face the entire surface of which is preferably but not necessarily in the same plane, against which face or surface a correspondingly leveled or flat cop carrier, having perforations through it from face to face, is mounted so as to cover the chambers of said carrier body, and caused to rotate referably thereto in such manner as to cause its perforations to successively present to the chambers of said carrier body.

Having thus described my invention, I claim:—

1. In an apparatus of the class herein recited, the combination, of a rotatable flat or disk-like cop carrier having perforations in communication with which cops are applied to its exterior,—a fixed correspondingly flat or disk-like carrier body against the face of which the cop carrier rotates, and which as to said face contains or embodies the mouths of fixed conduits over which mouths the perforations of the carrier are caused to successively present as the carrier rotates,—a tank or frame work referably to which the carrier body and conduits are fixed,—and means for rotating the carrier in a plane parallel with the plane in which the carrier body is erected,— substantially as set forth.

2. In an apparatus of the class herein recited, the combination, of a rotatable flat or disk-like cop carrier having perforations in communication with which cops are applied to its exterior,—a fixed correspondingly flat or disk-like carrier body against the face of which the cop carrier rotates, and which as to said face contains or embodies the mouths of fixed conduits and a dead face over which mouths and dead face the perforations of the carrier are caused to successively present as the carrier rotates,—a tank or framework referably to which the carrier body and conduits are fixed,—and means for rotating the carrier in a plane parallel with the plane in which the carrier body is erected,—substantially as set forth.

3. In an apparatus of the class herein recited, in combination,—a disk-shaped rotatable cop carrier provided with circumferentially and radially disposed groups of perforations,—a disk-shaped fixed carrier body having chambers or conduit mouths in its front face against which face the cop carrier is mounted for rotary movement,—a tank referably to which the cop carrier is fixed,—and conduits fixed referably to said carrier body and the mouths of which are the chambers therein,—substantially as and for the purposes set forth.

4. In an apparatus of the class herein recited, in combination, a disk-shaped rotatable cop carrier provided with circumferentially and radially disposed groups of perforations,— a disk-shaped fixed carrier body having chambers or conduit mouths and a dead face in its front face, against which front face the carrier is mounted for rotary movement,—a tank referably to which the cop carrier is fixed,—and conduits fixed referably to said carrier body and the mouths of which are the chambers therein,—substantially as and for the purposes set forth.

5. In an apparatus of the class herein recited, in combination,—a disk-like carrier body erected within a tank and embodying a sectoral face area constituting a dead face,—conduits the mouths of which open independently of each other through the front face of said carrier body and are conveniently constituted as independent chambers in said front face,—a disk-like cop carrier fitted to rotate in contact with the front face of the carrier body and having circumferentially distributed perforations or groups of perforations adapted in the rotation of the carrier to register successively with the dead face and with the conduit mouths,—cops applied to said perforations substantially in the manner set forth and projecting angularly from the exterior face of the cop carrier,—and suitable means for imparting rotation to said cop carrier,—substantially as and for the purposes set forth.

6. In combination with a carrier body having chambered and unchambered portions,—packings applied to said unchambered portions,—a cop carrier the inner face of which is fitted to the packed face of the carrier body and which is adapted to rotate referably to the axis of said carrier body,—and means, essentially, for instance, such as set forth, for maintaining the cop carrier in close contact with the face of the carrier body,—substantially as set forth.

7. In an apparatus of the class herein recited, in combination,—a disk-shaped cop carrier provided with perforations and with a peripheral flange,—a disk-shaped fixed carrier body having chambers or conduit mouths in its front face, and having also a peripheral bearing face upon which the cop carrier is by means of its flange mounted for rotation, in which position its flat face bears against the conduit mouths,—a tank referably to which the cop carrier is fixed,—conduits fixed referably to said carrier body and the mouths of which are the chambers therein,—and means for rotating the cop carrier,—substantially as and for the purposes specified.

8. In an apparatus of the class herein recited, in combination, a disk-shaped cop carrier provided with perforations,—a disk-shaped fixed carrier body having chambers or conduit mouths in its front face,—a gudgeon axially disposed and fixed with reference to both the cop carrier and the carrier body by means of which the cop carrier is applied for rotary movement referably to the cop carrier and in such manner as to cause the presentation of its perforations successively over the chambers of the carrier body,—a tank referably to which the carrier is fixed,—conduits fixed referably to the tank and carrier body, and means for rotating the cop carrier, substantially as and for the purposes set forth.

9. In an apparatus of the class herein recited, in combination, a disk-shaped rotatable cop carrier provided with perforations and with a circular rack,—a disk-shaped fixed carrier body having chambers or conduit mouths in its front face against which face the cop carrier is mounted for rotary movement in a plane parallel with the plane of said carrier body,—conduits fixed referably to said carrier body and the mouths of which are the chambers therein,—a tank referably to which the cop carrier is fixed,—and a driving pinion fixedly housed referably to the tank and meshing with the rack upon the cop carrier,—substantially as set forth.

In testimony whereof I have hereunto signed my name this 16th day of July, A. D. 1887.

AUGUST GRAEMIGER.

In presence of—
JOSEPH C. ELY,
HERBERT ALMY.